July 28, 1959 D. RICHMAN 2,897,266

TELEVISION FIELD-IDENTIFICATION SYSTEM

Original Filed Nov. 30, 1951 4 Sheets-Sheet 1

INVENTOR.
DONALD RICHMAN
BY Laurence B. Dodds
ATTORNEY

TELEVISION FIELD-IDENTIFICATION SYSTEM

Original Filed Nov. 30, 1951

*INVENTOR.*
DONALD RICHMAN
*BY* Laurence B. Dodds
ATTORNEY

July 28, 1959 D. RICHMAN 2,897,266

TELEVISION FIELD-IDENTIFICATION SYSTEM

Original Filed Nov. 30, 1951 4 Sheets-Sheet 3

INVENTOR.
DONALD RICHMAN

BY Laurence B. Dodds

ATTORNEY

INVENTOR.
DONALD RICHMAN
BY Laurence B. Dodds
ATTORNEY

United States Patent Office 2,897,266

Patented July 28, 1959

2,897,266

TELEVISION FIELD-IDENTIFICATION SYSTEM

Donald Richman, Fresh Meadows, N.Y., assignor to Hazeltine Research, Inc., Chicago, Ill., a corporation of Illinois Continuation of application Serial No. 259,171, November 30, 1951. This application November 16, 1956, Serial No. 623,279

6 Claims. (Cl. 178—7.3)

*General*

Figure 1:
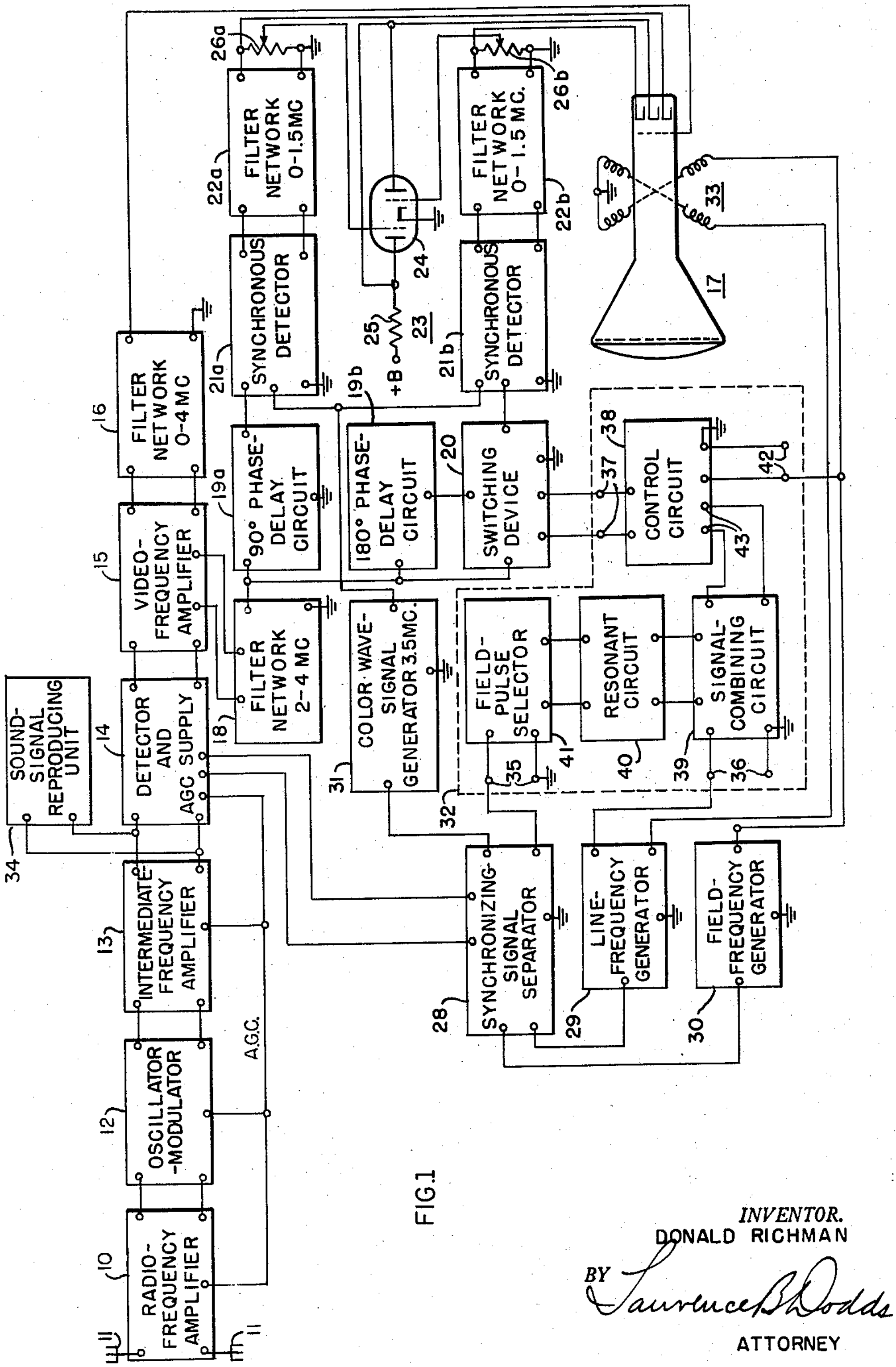

This invention relates to field-identification systems for conventional television systems of the odd-line interlaced type and, particularly, for color-television systems utilizing such interlacing for determining whether a field being scanned is composed of odd or even lines of scan. The present invention is directed to an improvement in the field-identification system described in applicant's copending application, Serial No. 244,756, filed September 1, 1951 (now United States Patent No. 2,697,-744), and entitled "Television Field-Identification System."

This application is a continuation-in-whole of application Serial No. 259,171, filed November 30, 1951, now abandoned.

In a form of color-television system more completely described in the RCA Review for December 1949, volume X, at pages 504–524, inclusive, color signals individually representative of the basic colors, specifically green, red, and blue of a color image being televised, are developed at a transmitter and components of these signals are applied as modulation signals to a subcarrier wave signal effectively to modulate the latter signal in a predetermined phase sequence. Conventionally, the modulated subcarrier wave signal has a predetermined frequency less than the highest video frequency and has amplitude and phase characteristics related to the basic colors of the televised image. In a specific form of such system the subcarrier wave signal is effectively modulated at 120° phase points by successive ones of the three basic color-signal components. At any one time the green, red, and blue color-signal components may modulate the subcarrier in the order in which they are mentioned. At another time, as described in copending application, Serial No. 207,154, Bernard D. Loughlin, entitled "Color-Television System," and filed January 22, 1951, now abandoned, the color-signal components may modulate the subcarrier wave signal at the transmitter in a different phase sequence, for the purpose of minimizing the visual effects of cross talk caused by deriving the color-signal components at the receiver at improper phase angles. For example, the green, blue, and red color-signal components may modulate the subcarrier wave signal in that order during one field of scan and in the order of green, red, and blue during the successive field of scan. In addition to the modulated subcarrier wave signal, a signal representative of the brightness of the image is also developed at the transmitter and combined in an interleaved manner with the modulated subcarrier wave signal to form in a pass band common to both signals a resultant signal which is transmitted in a conventional manner.

A receiver in such a system intercepts the transmitted signal and initially derives therefrom the modulated subcarrier wave signal and the brightness signal. The modulation components of the subcarrier wave signal are then detected by a deriving means which is designed to operate in synchronism and in proper phase relation with the subcarrier wave-signal modulating means at the transmitter. As described in the previously mentioned application, Serial No. 207,154, these signals may be effectively derived from the subcarrier wave signal by deriving the quadrature modulation components thereof. It is desired that the deriving means develop at its output circuit color-signal components which correspond in all their important characteristics with the components utilized to modulate the subcarrier wave signal at the transmitter. Furthermore, since several color signals modulate the subcarrier wave signal at different phase points thereon, it is particularly important that the deriving means at the receiver operate in proper phase relationship with respect to a predetermined phase of the modulating means at the transmitter. The color-signal components derived at the receiver are combined with the brightness signal to reproduce on the image-reproducing device of the receiver a color image corresponding to the image being televised at the transmitter.

In a receiver in accordance with the improved color-television system described in the copending application, Serial No. 207,154 previously referred to herein, the phase sequence in which the color-signal components are derived is changed periodically in synchronism with a corresponding change at the transmitter. The color-signal components effectively are derived in the previously mentioned one phase sequence during one group of scanning fields, for example, in the sequence green, red, and blue. During another group of scanning fields interlaced with the first-mentioned group the color-signal components are derived in another phase sequence, for example, in the sequence green, blue, and red. Therefore, in order that the color signal-deriving means in the receiver be properly controlled to derive the color-signal components in the proper phase sequence, it is desirable to develop a control effect representative of the change from one sequence to another and indicative of the sequence which should be employed at any given time. Since these sequence changes occur in relation to the fields being scanned, if the fields can be identified as odd-line or even-line fields, then a control effect may be developed to define such fields and the type lines therein. Such a control effect can then be utilized to assure that the proper phase sequence occurs during the identified field. In this manner, if such synchronizing of the phase sequences at the transmitter and receiver occurs on identified fields, then between such identification periods the phase sequences may be changed at field frequency with some assurance that the color signal-deriving means in the receiver is operating in synchronism with the color signal-modulating means at the transmitter.

The United States Patent No. 2,697,744 previously referred to herein describes a field-identification system which effects the result just discussed. Though the system described in the last-mentioned patent is generally suitable to effect field identification, it is not as immune to noise pulses which simulate line-frequency pulses as might be desired for some applications. The present invention is directed to a field-identification system which is substantially more immune to such noise pulses.

It is an object of the present invention, therefore, to provide for a television system a new and improved field-identification system which is relatively simple in construction and stable in operation.

It is another object of the present invention to provide a new and improved field-identification system for an odd-line interlaced television system for identifying the even-line fields with respect to the odd-line fields and which is relatively immune to noise pulses.

It is still another object of the present invention to provide a new and improved field-identification system for use in an odd-line interlaced television system which is capable of utilizing conventional television synchronizing pulses to effect the identification of the different fields.

It is still a further object of the present invention to provide for use in the improved type of color-television system described in copending application, Serial No. 207,154 previously discussed, a new and improved field-identification system for developing a control effect to synchronize the phase sequence in which the receiver color signal-deriving means derives color signals with that phase sequence in which those color signals modulate a subcarrier wave signal at the transmitter.

For a better understanding of the present invention, together with other and further objects thereof, reference is had to the following description taken in connection with the accompanying drawings, and its scope will be pointed out in the appended claims.

Figure 2:
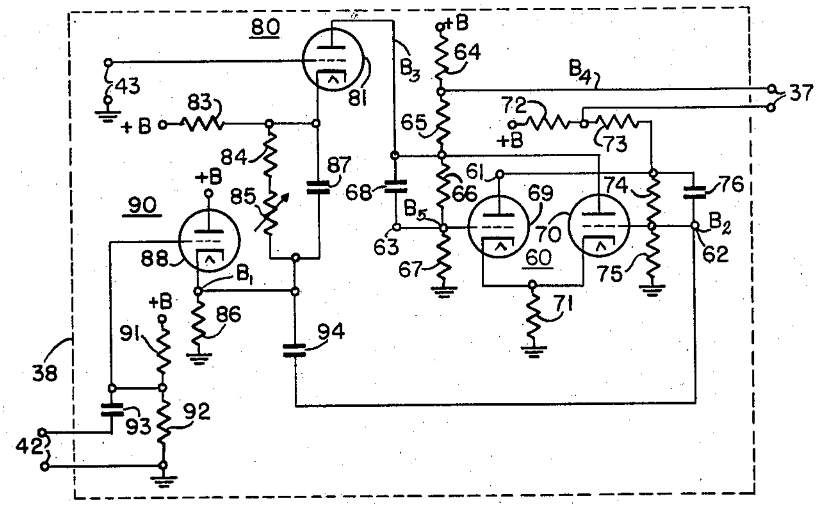
Figure 5:
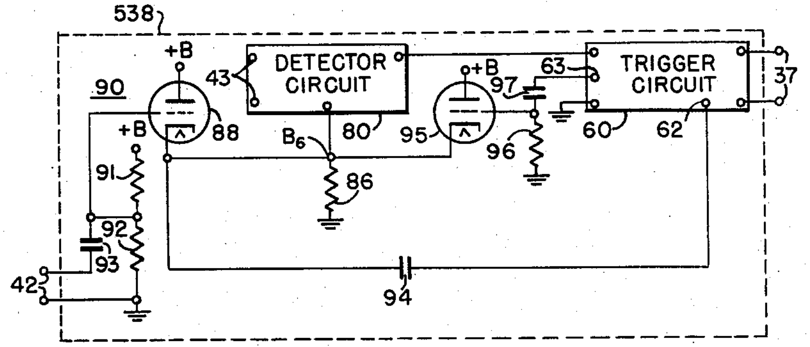
Figure 6:
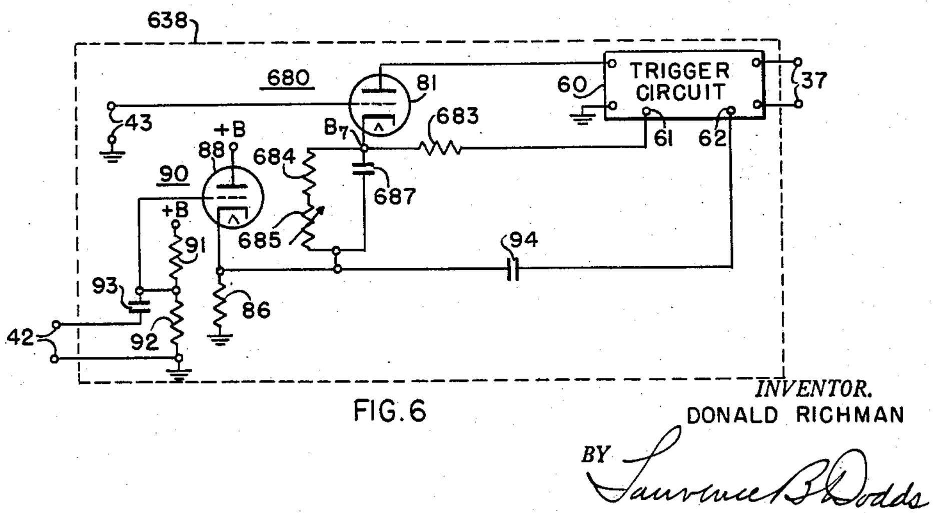

In the drawings:

Fig. 1 is a schematic diagram representing a color-television receiver embodying a field-identification system in accordance with one form of the invention;

Figs. 2, 5 and 6 are circuit diagrams including modified forms of portions of the field-identification system of Fig. 1, and Figs. 3*a*, 3*b* and 4 are graphs utilized in explaining the operation of one or more of the modifications of Figs. 2, 5, and 6.

*General description of receiver of Fig. 1*

Referring now to Fig. 1 of the drawings, there is represented a color-television receiver of the type employed in an odd-line interlaced television system and, particularly, of the type employed in the improved color-television system described in the copending application, Serial No. 207,154 previously referred to herein. The receiver includes a radio-frequency amplifier 10 of one or more stages having an input circuit coupled to an antenna system 11, 11. Coupled in cascade with the output circuit of the amplifier 10 in the order named are an oscillator-modulator 12, an intermediate-frequency amplifier 13 of one or more stages, a detector and automatic-gain-control (AGC) supply 14, a video-frequency amplifier 15 of one or more stages, and a 0–4 megacycle filter network 16. The output circuit of the network 16 is coupled to an intensity control electrode of a cathode-ray tube in an image-reproducing device 17. This cathode-ray tube may, for example, comprise a single tube having a plurality of cathodes individually responsive to the different color signals, and an arrrangement for directing the beams emitted from the separate cathodes onto suitable color phosphors. Such a tube is more fully described in an article entitled "General Description of Receivers for the Dot-Sequential Color Television System Which Employ Direct-View Tri-Color Kinescopes," in the RCA Review for June 1950, at pages 228–232, inclusive. It will be understood that other suitable types of color-television image-reproducing devices may be employed.

Coupled in cascade with another output circuit of the amplifier 15 in the order mentioned are a 2–4 megacycle filter network 18, a phase-delay circuit **19*a*, a synchronous detector 21*a*, a 0–1.5 megacycle filter network 22*a*, and one of the cathodes of the cathode-ray tube in the device 17. The output circuit of the network 18 is also coupled either through a phase-delay circuit 19*b* and a switching device 20 or directly through the switching device 20 to a synchronous detector 21*b*, the coupling path being determined by the switching position of the device 20 for a purpose more fully to be considered hereinafter. Device 20 may be viewed as a means for utilizing the control signal developed by the pulse-responsive circuit hereinafter described. The detector 21*b* is coupled through a filter network 22*b* to another one of the cathodes of the cathode-ray tube in the device 17. Detectors of the type of units 21*a* and 21*b* are more fully described in the copending application, Serial No. 207,154 previously referred to herein. Voltage dividers 26*a* and 26*b* are connected across the output circuits of the networks 22*a* and 22*b*, respectively, adjustable taps on these dividers being individually connected to separate control electrodes in a signal-combining circuit 23 including an electron-discharge tube 24. The tube 24 also includes a cathode which is effectively connected to the low potential terminal of each of the voltage dividers 26*a* and 26*b* and a pair of anodes jointly coupled through a load resistor 25 to a source of potential +B and to the remaining one of the cathodes in the cathode-ray tube of the device 17. A color wave-signal generator 31, which may be a conventional sine-wave oscillator for developing a signal having a frequency of approximately 3.5 megacycles, is connected to an input circuit in each of the detectors 21*a* and 21*b*. The phase-delay circuits 19*a* and 19*b* are proportioned to delay the phase of the signals applied thereto by approximately 90° and 180°, respectively for a signal having a frequency the same as that of the signal developed in the unit 31**.

An output circuit of the unit 14 is coupled through a synchronizing-signal separator 28 to line-scanning and field-scanning windings 33 in the device 17 through a line-frequency generator 29 and a field-frequency generator 30, respectively. The separator 28 is also connected to an input circuit of the generator 31 and to a pair of terminals 35, 35 in a field-identification system 32 for a purpose which will be described more fully hereinafter. The generators 29 and 30 are additionally connected through a pair of terminals 36, 36 and a pair of terminals 42, 42, respectively, to the unit 32.

An additional output circuit of the unit 14, specifically of the AGC supply therein, is connected to the input circuits of one or more of the tubes of the radio-frequency amplifier 10, the oscillator-modulator 12, and the intermediate-frequency amplifier 13 in a well-known manner to maintain the signal input to the detector 14 within a relatively narrow range for a wide range of received signal intensities. A sound-signal reproducing unit 34 is also connected to the output circuit of the intermediate-frequency amplifier 13 and may have stages of intermediate-frequency amplification, a sound-signal detector, stages of audio-frequency amplification, and a sound-reproducing device.

It will be understood that the various units thus far described with the exception of the field-identification system 32 may be of any conventional construction and design. The details of such units are well known in the art and are more fully described in the copending application, Serial No. 207,154 previously referred to herein, thereby rendering a further description thereof unnecessary.

*General operation of receiver of Fig. 1*

In considering briefly the operation of the receiver of Fig. 1 as a whole, it will be assumed that the field-identification system 32 is a system for controlling the operation of the switching device 20 to effect either direct coupling of the output circuit of the unit 18 to the detector **21*b* or coupling to the detector 21*b* through the 180° phase-delay circuit 19*b*. A desired composite television wave signal including color information is intercepted by the antenna system 11, 11. The signal is selected and amplified in the radio-frequency amplifier 10 and applied to the oscillator-modulator 12 wherein it is converted to an intermediate-frequency signal. The latter signal is then selectively amplified in the unit 13 and supplied to the detector 14 wherein its modulation components are derived. These modulation components are translated through the amplifier 15 and include a 0–4 megacycle brightness component which is translated through the filter network 16 and applied to the intensity control electrode of the cathode-ray tube in the device 17. The modulation components derived in the unit 14 also include a 3.5 megacycle modulated subcarrier wave signal which is translated through the filter network 18, delayed in phase by 90° in the unit 19***a* and applied to the synchronous detector 21*a*. This 3.5 megacycle wave signal is also applied directly, that is, without appreciable phase delay through the switching device 20 or through the units 19*b* and 20 with a phase delay of 180° to the synchronous detector 21*b*. The mode of operation of the units 19*b* and 20 will be described more fully hereinafter.

The synchronizing-signal components of the video-frequency signal are separated from the video-frequency components in the separator 28 and are used to synchronize the operation of the line-frequency and field-frequency generators 29 and 30. These generators supply signals of saw-tooth wave form which are properly synchronized with reference to the transmitted television signal and are applied to the deflection windings 33, thereby to effect a scanning of the target screen in the cathode-ray tube in a sequence of lines by deflecting the cathode-ray beam in this tube in two directions normal to each other. The synchronizing-signal components also include a signal, conventionally designated as a color burst signal, for synchronizing the operation of the 3.5 megacycle sine-wave generator 31 with a corresponding 3.5 megacycle wave-signal generator at the transmitter. The synchronized sine-wave signal developed in the unit 31 is applied directly to input circuits in the detectors 21*a* and 21*b*. Briefly, the detector 21*a* is effective to derive the modulation components at a 90° phase point of the modulated subcarrier wave signal, these components in the system under consideration being representative of the blue color of the image. The detector 21*b* is effective to derive the components representative of the red color of the image. By controlling the operation of the switching device 20 by means of the unit 32 so that the modulated subcarrier wave signal is applied to the detector 21*b* without appreciable phase delay, the latter components are derived during one field of scan from a point on the subcarrier wave signal 90° in phase ahead of the point at which the components representative of blue are derived, that is, the latter components are derived at a 0° phase point of the subcarrier wave signal. By causing the sub-carrier wave signal to be translated through the 180° phase-delay circuit 19*b*, the components representative of red are derived during the succeeding field from a point on the subcarrier wave signal lagging by 90° in phase that point at which the components representative of blue are derived. Thus the phase sequence in which the color-signal components are derived on alternate fields is changed in synchronism with a similar sequence change at the transmitter for reasons previously considered. The switching device 20 is controlled to effect such change in the sequence of the derived signals by a control effect derived in the field-identification system 32 in a manner to be described more fully hereinafter.

The 0–1.5 megacycle portion of the blue color-signal components derived in the unit 21*a* is translated through the unit 22*a* and applied to one of the cathodes in the cathode-ray tube in the device 17. Similarly, the 0–1.5 megacycle red components are translated through the unit 22*b* and applied to another one of the cathodes in the cathode-ray tube of the device 17. Portions of the blue and red components developed across the voltage dividers 26*a* and 26*b*, respectively, are combined in the signal-combining device 23 to develop a signal representative of the green color of the image in a manner more fully described in copending application, Serial No. 207,154. The signal representative of the green component is then applied to the remaining cathode of the cathode-ray tube in the device 17. The color-signal components on the cathodes of the cathode-ray tube and the brightness signal on the control electrode thereof modulate the intensity of the electron beams emitted from the different cathodes in accordance with the amplitude variations of the applied signals, and the scanning action of the intensity-modulated beams is effective to reproduce the color image being televised at the transmitter.

The automatic-gain-control (AGC) signal derived in the unit 14 is effective to control the amplification of one or more of the units 10, 12, and 13 to maintain the signal input to the detector 14 and to the sound-signal reproducing unit 34 within a relatively narrow range for a wide range of received signal intensities. The sound-signal modulated wave signal having been selected by the unit 10, converted to an intermediate-frequency signal in the unit 12 and translated through the unit 13 is applied to the unit 34. Therein it is amplified and detected to derive the sound-signal modulation components which may be further amplified and then reproduced in the reproducing device of the unit 34.

*Description of field-identification system of Fig. 1*

Referring now, in particular, to the field-identification system 32 of Fig. 1, this system comprises a circuit for supplying line-frequency pulses and groups of field-frequency pulses and which is subject also to supply spurious noise pulses. More specifically, the supply circuit includes the terminals 35, 35 and an input circuit of a field-pulse selector 41 coupled thereto. As previously described herein, the terminals 35, 35 are coupled to an output circuit of the synchronizing-signal separator 28. The groups of field-frequency pulses have one time relation with respect to the line-frequency pulses during one group of fields and another time relation during fields interlaced therewith.

The field-identification system also includes a pulse-responsive circuit coupled to the supply circuit for developing a control signal uniquely representative of one of the groups of field-frequency pulses but also subject to develop this control signal in response to at least some of the noise pulses. More specifically, the pulse-responsive circuit includes a signal-generating means coupled to the supply circuit including the terminals 35, 35 for developing a signal substantially in coincidence with each of the aforementioned groups of field-frequency pulses and having a peak amplitude at a time in the vicinity of a line frequency pulse of one of the aforementioned one group of fields. This peak amplitude at another time may be in the vicinity of a noise pulse occurring during one of the interlaced fields. In particular, the signal-generating means includes a signal-selector device, specifically, the field-pulse selector 41 for selecting signals representative of the field-frequency pulses and for translating the selected signals. The signal-generating means also includes a tuned circuit, specifically, a resonant circuit 40 coupled to the signal-selector device 41 and having a resonant frequency corresponding substantially to one-half the frequency of the line-frequency pulses for excitation by the selected signals to develop an output signal. A more complete description of the units 40 and 41 and of a unit 39 now to be considered is presented in United States Patent No. 2,697,744 previously mentioned. In the patent just referred to, with reference to Figs. 2 and 3 thereof, the unit 40 may be a conventional tuned circuit and the unit 41 may be a portion of the synchronizing-signal separator having both line-frequency and field-frequency pulses. The resonant circuit in such a combination is effective to develop signals of greater amplitude from the concentrated energy of the field-frequency pulses than from the dispersed eneregy of the line-frequency pulses.

The pulse-responsive circuit also includes means coupled through the units 28 and 29 to the supply circuit including the terminals 35, 35 for supplying pulse signals substantially synchronous with the line-frequency pulses. More specifically, the latter means comprises an input circuit of a signal-combining circuit 39 coupled to the terminals 36, 36 which, as previously described, are coupled to an output circuit of the line-frequency generator 29.

The pulse-responsive circuit additionally includes a control system jointly responsive to the developed pulse signals and the developed coincidence signal for developing a control signal representative of the time relation of the line-frequency pulses and the groups of field-frequency pulses. This control system includes the signal-combining circuit 39 jointly responsive to the developed pulse signals applied to the terminals 36, 36, these signals being representative of line-frequency pulses, and to the developed coincidence signal applied from the unit 40 for combining these signals to develop resultant signals.

A control circuit 38 is coupled between the output circuit of the unit 39 and through terminals 37, 37 to the switching device 20. A circuit diagram of the unit 38 is represented in Fig. 2 and this unit will now be described.

The unit 38 includes a keyed detector circuit 80 comprising a triode 81 having a control electrode coupled to one of the terminals 43, 43, the other terminal 43 being effectively coupled to one terminal of the cathode load circuit of the tube 81. This cathode load circuit comprises a portion of a voltage divider having series-connected resistors 83, 84, 85, and 86 coupled across a source of B potential. The cathode of the tube 81 is connected to the junction of the resistors 83 and 84, the resistor 85 is adjustable, the resistors 84 and 85 are by-passed for signal energy by a condenser 87, and the resistor 86 is additionally a cathode-follower load resistor for a triode 88 of a keying circuit 90. The anode of the tube 88 is directly connected to a source of potential +B while the control electrode of this tube is coupled to a positive potential on a voltage divider comprising series-connected resistors 91 and 92 coupled across a source of B potential. The control electrode of the tube 88 is also coupled through a condenser 93 to one of the terminals 42, 42, the other of these terminals being effectively connected to the cathode circuit of the tube 88.

The anode of the detector tube 81 is connected to a source of potential +B on a voltage divider comprising series-connected resistors 64, 65, 66, and 67 coupled across a source of B potential, and is also connected through a coupling condenser 68 coupled across the resistor 66 to the control electrode of a triode 69. The circuit including the triode vacuum tube 69 and a similar tube 70 comprises a trigger or counting circuit of the Eccles-Jordan type having two stable operating conditions. The cathodes of the tubes 69 and 70 are jointly connected through a cathode load resistor 71 to the low potential terminal of a source of potential +B. The anode of the tube 70 is connected to the junction of resistors 65 and 66 for potential +B and effectively through the condenser 68 to the control electrode of the tube 69. Similarly, the anode of the tube 69 is connected to a point of potential +B on a voltage divider comprising series-connected resistors 72, 73, 74, and 75 coupled across the source of potential +B, this anode also being connected through a condenser 76 coupled across the resistor 74 to the control electrode of the tube 70. The output terminals 37, 37 of the unit 38 are individually connected to the anode load circuit of the tube 70 at the junction of resistors 64 and 65 and to the anode load circuit of the tube 69 at the junction of resistors 72 and 73. The control electrode of the tube 70 is also coupled through a coupling condenser 94 to the cathode load resistor 86 of the tube 88.

The field-identification system 32 of Fig. 1 also includes a disabling circuit, specifically a portion of the control circuit 38, responsive to the control signal developed in the control system including the unit 38 and effective substantially to diminish the response of the pulse-responsive circuit and, more particularly, the control system thereof to signals related to the previously mentioned noise pulses. The circuit elements of the disabling circuit are so proportioned that the unresponsive period thereof has a duration substantially less than the interval between successive groups of the field-frequency pulses. More specifically, referring to the circuit of Fig. 2, this disabling circuit comprises a time-constant network including the condenser 68 and at least the resistors 66 and 67. The parameters of this network are so proportioned as to develop a time constant which has a value substantially less than the interval between successive groups of the field-frequency pulses but which is greater than the duration of the conventional vertical retrace pulse occurring in the circuit including the terminals 42, 42 during the retrace interval of the field-synchronizing system. The condenser 76, together with the resistors 74 and 75 may also be proportioned to provide a similar, specifically a duplicate, time-constant network in the circuit including the tube 70. The condenser 94 in cooperation with the resistive components in the input circuit of the tube 70 comprises a differentiating circuit effective to differentiate the pulse signal developed across the cathode load resistor 86. The control circuits of the tubes 69 and 70 are so biased that these tubes are effectively triggered only by negative-going pulses.

*Explanation of operation of field-identification system 32 of Fig. 1*

Figure 3A:
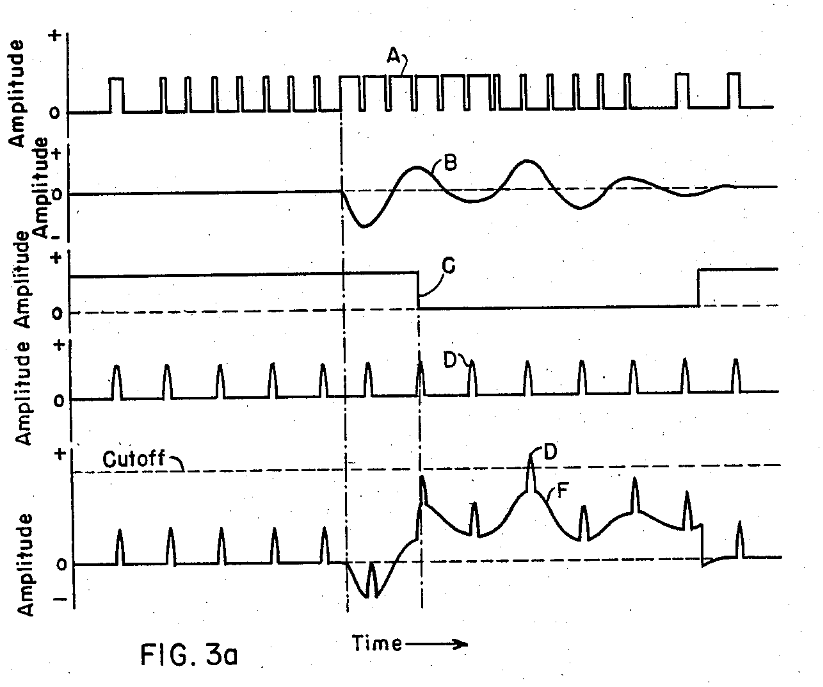
Figure 3B:
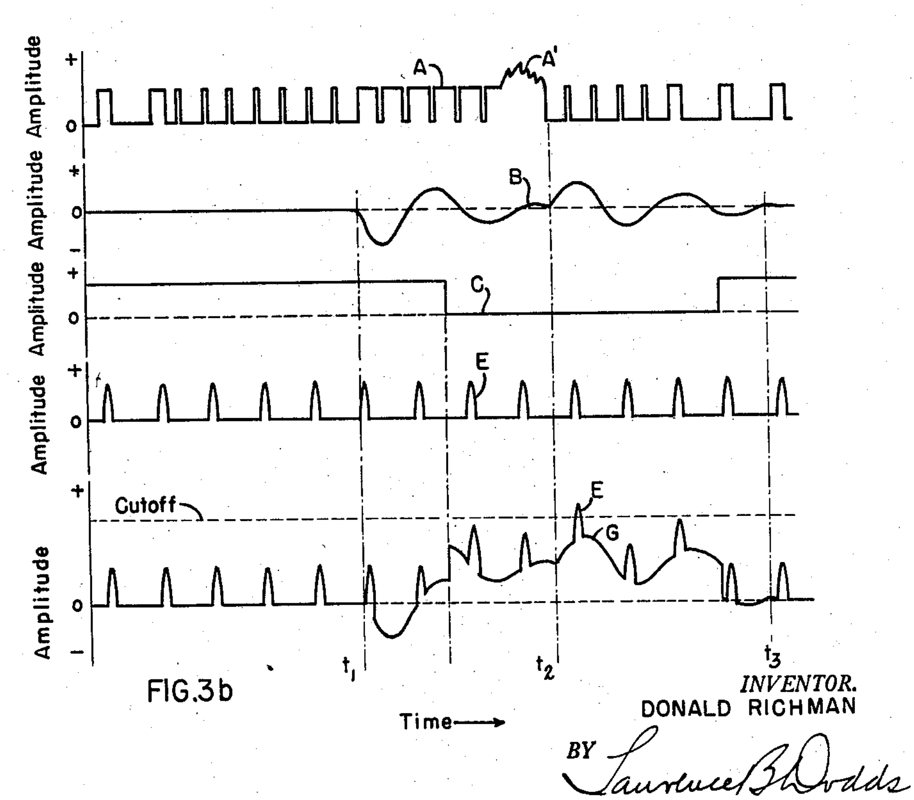

In considering the operation of the field-identification system 32 of Fig. 1 reference is made to curves A–G, inclusive, of Figs. 3a and 3b, each curve having coordinates of time and amplitude and representing the wave form of a signal effectively associated with a specific circuit in the system 32 of Fig. 1. The composite synchronizing signal, including the line-frequency and field-frequency pulses as represented by curve A of Fig. 3a for one field of scan and curve A of Fig. 3b for an interleaved field, and noise pulses as represented by curve A' in Fig. 3b, is applied to the terminals 35, 35 from a unit such as the signal separator 28 of Fig. 1. As described more fully in the United States Patent No. 2,697,744, the field-pulse selector 41 is effective to select the field-frequency pulses of the signals represented by curve A of Fig. 3a and curve A of Fig. 3b. These selected pulses are applied to the resonant circuit 40 to shock-excite by means of both the leading and trailing edges of these pulses the resonant circuit 40 sufficiently to develop an output signal therein having in the absence of a noise pulse such as represented by curve A' of Fig. 3b the wave form represented in idealized form by curve B of Fig. 3a, this signal being applied to the signal-combining circuit 39 in the control system including the units 39 and 38. When a noise pulse such as represented by curve A' of Fig. 3b overrides the trailing edge of a group of field pulses thereby causing the field pulses to be apparently terminated at a later time than normal, an output signal having the wave form represented by curve B of Fig. 3b is developed in the resonant circuit 40. It is apparent that the portion of the signal occurring during the interval $t_2$—$t_3$ and represented by a portion of curve B of Fig. 3b does not have the same time-space characteristic in its field of scan as the signal represented by curve B of Fig. 3a does in its field of scan and that the difference is caused by the noise pulse represented by curve A' of Fig. 3b.

There is also applied to the control system, specifically, to the unit 38 through terminals 42, 42 a pulse representative of the conventional field-retrace pulse as represented by curve C in both Figs. 3a and 3b and normally developed in the system including the field-frequency generator 30 and the field-deflection portion of the windings 33 during the retrace period of each field of scan. In addition, pulse signals, specifically, line-frequency pulses occurring during horizontal retrace, and having the wave form represented by curve D of Fig. 3a are applied to the control system and, specifically, to the signal-combining circuit 39 therein through the terminals 36, 36 during one field of scan. During another field of scan analogous pulse signals having the wave form represented by curve E of Fig. 3b are similarly applied to the control system.

As described in United States Patent No. 2,697,744, the signals having the wave forms represented by curves B, C, and D of Fig. 3a effectively combine to develop composite signals as represented by curve F of Fig. 3a at the input circuit of the control circuit 38, specifically, at terminals 43, 43. As explained in the patent just mentioned, the wave form represented by curve F is effective to identify one field with respect to an adjacent field by a determination of the time relationship of a line-frequency pulse with respect to a peak amplitude of the signal represented by curve B of Fig. 3a. Effectively the timing of the field-frequency pulses is compared with that of the line-frequency pulses to determine the character of the field. As explained in the last-mentioned patent, in accordance with present television standards, the line-frequency pulses have such a time relation with respect to the field-frequency pulses during one field of each frame as to coincide with peak amplitudes of the signal represented by curve B of Fig. 3a and thus to cause the signal represented by curve F to be developed. During the other field of the frame the line-frequency pulses represented by curve E of Fig. 3b should occur in such time relation with respect to a signal of the type represented by curve B of Fig. 3a as to develop a composite signal analogous to that represented by curve F but in which the line-frequency pulses represented by curve E do not coincide with peak amplitudes of the signal represented by curve B of Fig. 3a. This desired result may not be obtained if a noise pulse such as represented by curve A′ of Fig. 3b occurs. In a manner now to be explained, such a noise pulse may cause line-frequency pulses to coincide with peak amplitudes of the signal developed in the resonant circuit 40 during both fields of a frame. This result prevents identification of one field of the frame with respect to the other and causes any apparatus such as the switching device 20 of Fig. 1 which is controlled by signals representative of such identification to operate incorrectly.

As previously explained herein, during the other field of the frame the resonant circuit 40 will initially be shock-excited at the proper time $t_1$ to develop a signal such as represented by the portion of curve B of Fig. 3b in the interval $t_1$—$t_2$. Since the trailing edge of this group of field pulses is encumbered by a noise pulse such as represented by curve A′, the circuit 40 will be shock-excited by the trailing edge of the noise pulse at a time $t_2$ later than normal to develop a signal during the interval $t_2$—$t_3$ out of phase with the initially developed signal and represented by the latter portion of curve B of Fig. 3b. The composite signal represented by curve B of Fig. 3b is combined in the signal-detection circuit 80 with the signals represented by curves C and E of Fig. 3b effectively to develop a signal such as represented by curve G in the control electrode-cathode circuit of the unit 80. It is apparent that the line-frequency pulses represented by curve E properly occur at the reference axis and not at the peak amplitudes of the sine wave developed in the unit 40 during the portion of the signal represented by curve G occurring during the interval $t_1$—$t_2$. However, during the interval $t_2$—$t_3$, due to the shift in phase of the signal developed by the resonant circuit 40, at least some of these pulses occur at the peak amplitudes of the latter portion of the signal represented by curve B of Fig. 3b. As a result the field-recognition system is ineffective to discern any difference in the two fields of the frame and develops similar control effects for each field. It is a principal purpose of the present invention to provide a disabling circuit which will prevent such erroneous response.

Figure 4:
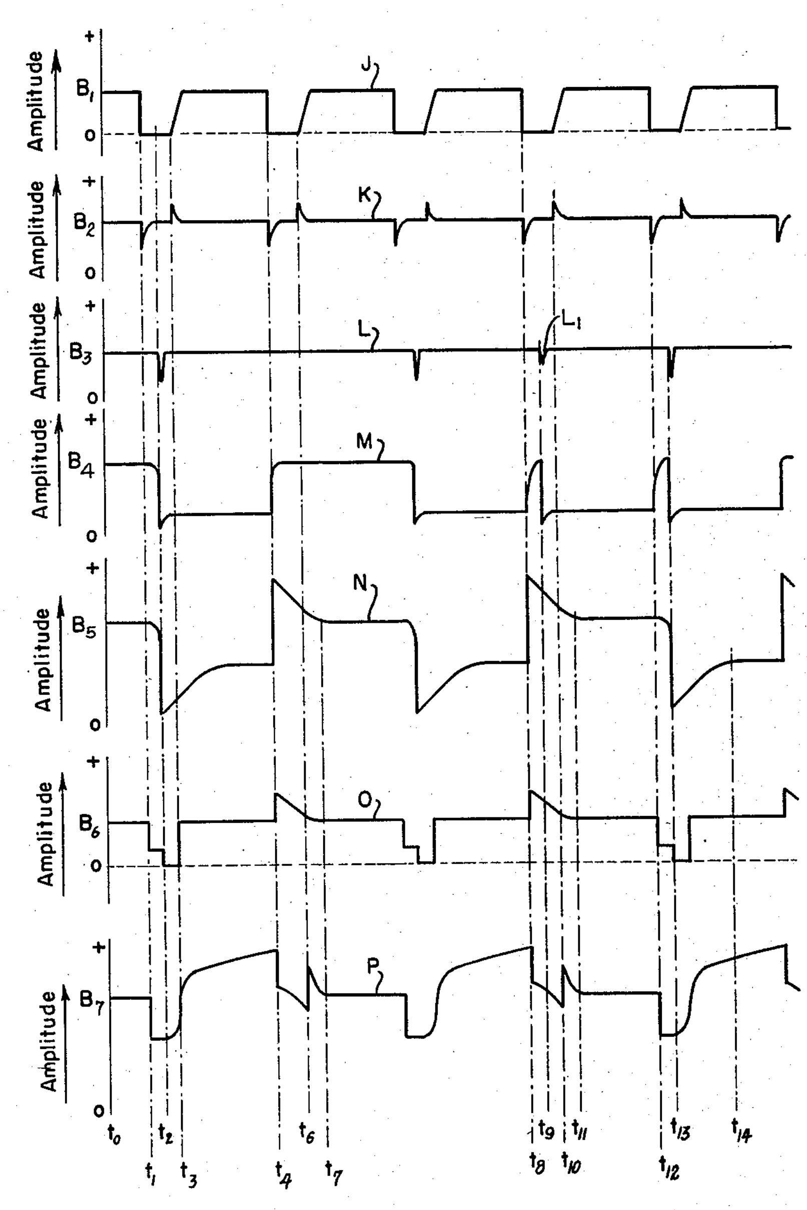

Consider now the circuit of Fig. 2 and the curves J–N, inclusive, of Fig. 4, each of the latter curves representing the wave form of a signal associated with a specific point in the circuit of Fig. 2. The reference characters $B_1$–$B_7$, inclusive, indicating potential levels with respect to these curves and with respect to curves O and P to be considered hereinafter refer to the positive potentials of the specific circuits at an arbitrary time $t_0$. Similar reference characters are utilized in Figs. 2, 4, and 5 to indicate the points in the specific circuits having these potential levels. The field-retrace pulse previously represented by curve C in both Figs. 3a and 3b on an expanded time scale is represented in idealized form for seven fields of scan by curve J of Fig. 4 on a reduced time scale. This retrace pulse is applied to terminals 42, 42 of Fig. 2 and is effective to develop across the cathode load resistor 86 a corresponding pulse which is differentiated in the circuit including the condenser 94 and the resistive components in the input circuit of the tube 70 to have a wave form represented by curve K. As previously explained the tubes 69 and 70 are responsive only to negative-going pulses and, therefore, the negative-going portion of the differentiated pulse represented by curve K is effective to control the operation of the tube 70 in a manner to be described more fully hereinafter. Signals such as are represented by curves F of Fig. 3a and G of Fig. 3b are applied through the terminals 43, 43 of Fig. 2 to the detector including the tube 81 and are effective to develop resultant signals in the output circuit of the tube 81 for application to the control electrode of the tube 69. The output signals developed from the desired signals as represented by curve F of Fig. 3a are represented by curve L of Fig. 4 while an output signal developed from the undesired signal represented by curve G of Fig. 3b is represented by curve $L_1$ of Fig. 4. The desired negative-going pulse signals represented by curve L are indicative of fields of similar types, that is, either odd-line or even-line fields whereas the undesired pulse represented by curve $L_1$ is a spurious response which indicates the occurrence of a field of one character when actually a field of another character is present, and is effective to disturb the operation of the field-recognition system.

Considering now, more specifically, the operation of the trigger circuit 60, it will be assumed initially that the tube 69 is conducting and the tube 70 is cut off at time $t_0$ and a signal such as represented by curve M of Fig. 4 is being deevloped in the anode circuit of the tube 70. At time $t_1$ a negative-going pulse as represented by curve K, being a portion of the derivative pulse of the vertical flyback pulse represented by curve J, is applied to the control electrode of the tube 70. Since the tube 70 is at cutoff, this pulse is ineffective to control the operation of the trigger circuit 60. At time $t_2$ a negative-going pulse as represented by curve L, being representative of the type of field being scanned, is applied through the condenser 68 to the control electrode of the tube 69. The latter pulse is effective to cause the tube 69 to become nonconductive and the tube 70 to become conductive because of the signal applied to the control electrode thereof through the condenser 76 from the anode of the tube 69. This status of operation is maintained for approximately one field of scan until a time $t_4$ when a negative-going pulse as represented by curve K is applied to the control electrode of the tube 70 through the terminal 62 to cause this tube to become nonconductive and the tube 69 to become conductive. This type of operation continues at substantially a field rate until the time $t_8$. At the time $t_8$ the negative-going pulse represented by curve K is properly effective to render the tube 70 nonconductive at a time when it should become nonconductive. As a result, the spurious pulse $L_1$, at the time $t_9$ when applied to the control electrode of the tube 69 from the output circuit of the detector 80, is effective to cause the tube 69 to become nonconductive and the tube 70 to become conductive at a time when such operation of these tubes should not occur. Thus, an erroneous output signal is developed in the output circuit including the terminals 37, 37 to control the operation of the switching device 20 in Fig. 1 during the period $t_9$—$t_{12}$. At the time $t_{12}$ the negative-going pulse represented by curve K is effective to cause the tube 70 to become nonconductive and the tube 69 to become conductive and at the time $t_{13}$ the reverse action properly occurs due to the application of a negative-going pulse represented by curve L to the control electrode of the tube 69. Thereafter, no other spurious pulses being applied to the control electrode of the tube 69, the system operates properly.

It is apparent that if the trigger circuit 60 operates in a manner to develop a signal as represented by curve M during the period $t_9$—$t_{12}$, the switching device 20 of Fig. 1 would cause the synchronous detectors 21a and 21b to derive the color-signal components in improper phase sequence and, thus, cause improper colors to be developed in the image-reproducing device 17 of Fig. 1 during this interval. Since this effect occurs substantially throughout the duration of one field it would be apparent to a viewer and is therefore highly undesirable. To prevent such an effect the disabling circuit previously described herein is coupled to the trigger circuit 60 in the control system of Fig. 2 to desensitize the control system with respect to such noise pulses.

As previously described herein, the network including the condenser 68 and at least the resistors 66 and 67 is proportioned to have a time constant substantially longer than the duration of the vertical retrace pulse represented by curve J. Additionally, the network including the condenser 76 and at least resistors 74 and 75 is similarly proportioned. Referring now to curve N of Fig. 4, as the signal derived from the vertical retrace pulse and represented by curve K is effective to render the tube 70 nonconductive and the tube 69 conductive at the time $t_8$, the time constant of the network including the condenser 68 is effective to develop a positive potential on the control electrode of the tube 69 of a magnitude represented by the amplitude of curve N at time $t_8$. This positive potential gradually decays to become a much lower positive potential $B_5$ at time $t_{11}$, the period $t_8$—$t_{11}$ being substantially longer than the duration $t_8$—$t_{10}$ of the vertical retrace pulse. Thus, when the spurious pulse represented by curve $L_1$ occurs at time $t_9$, it is ineffective to drive the control electrode of the tube 69 to such a potential as to render the tube 69 nonconductive. As a result the trigger circuit 60 is rendered unresponsive to pulses representative of noise applied to the trigger circuit from the detector 80 for an interval substantially less than the interval between the successive groups of the field-frequency pulses and substantially longer than the duration of the vertical retrace pulse. Since the vertical retrace pulse represented by curve K also acts as a keying pulse to render the detector including the tube 81 conductive only during the period of this pulse, the trigger circuit 60 need not be rendered unresponsive for a period much longer than that of the vertical retrace pulse. Though the present invention is directly concerned only with the response of the tube 69 to pulses applied thereto, the response of the tube 70 is controlled in a manner similar to that of the tube 69 as indicated by the exponential type signal in the negative-going portion of curve N. More specifically, just as the exponential portion of the signal initiated at time $t_8$ is effective to bias the control circuit of the tube 69 so highly positive as to render the tube 69 unresponsive to negative pulses of normal amplitude, the exponential portion initiated at time $t_{12}$ is effective in an opposite sense to cause the control circuit of the tube 70 to be biased at such a high negative potential as to render the tube 70 unresponsive, during the period $t_{12}$—$t_{14}$, to the positive pulse of normal amplitude which would be applied to the tube 70 from the anode of the tube 69 if the tube 69 became nonconductive during this period. By such dual control the immunity to erroneous triggering is increased.

While applicant does not intend to limit the invention to any specific circuit constants, the following circuit constants are given as illustrative of one embodiment of the invention constructed in accordance with the arrangement of Fig. 2.

| | |
|---|---|
| Resistors **64, 65, 72,** and **73** | 33 kilohms. |
| Resistors **66** and **74** | 330 kilohms. |
| Resistors **67** and **75** | 180 kilohms. |
| Resistor **71** | 56 kilohms. |
| Resistor **83** | 680 kilohms. |
| Resistor **84** | 270 kilohms. |
| Resistor **85** | 250 kilohms. |
| Resistor **86** | 3.3 kilohms. |
| Resistor **91** | 6.8 megohms. |
| Resistor **92** | 1.5 megohms. |
| Condensers **68** and **76** | 6800 micromicrofarads. |
| Condenser **87** | 0.1 microfarad. |
| Condenser **93** | 0.047 microfarad. |
| Condenser **94** | 200 micromicrofarads. |
| Tube **69** | ½ type 12AT7. |
| Tube **70** | ½ type 12AT7. |
| Tube **81** | ½ type 12AT7. |
| Tube **88** | ½ type 12AT7. |
| +B | 250 volts. |
| Amplitude of pulses applied to terminals **42, 42** | 60 volts. |
| Amplitude of pulses applied to terminals **43, 43** | 35 volts. |

*Description and explanation of operation of portion of field-identification system represented by Fig. 5*

There has been described herein with reference to Figs. 1 and 2 a field-identification system which is relatively immune to undesired noise pulses and in which the disabling circuit to effect such immunity is a time-constant network in the input circuit of the trigger circuit. It may be desirable for some applications to effect such disabling at a point in the field-identification system prior to the input circuit of the trigger circuit. The arrangement of Fig. 5 may be employed for the latter purpose. Since the circuit of Fig. 5 is similar to the circuit of Fig. 2, similar units are designated by the same reference numerals and analogous units are designated in the circuit of Fig. 5 by the same reference numerals with a prefix of 5.

In the circuit arrangement represented by Fig. 5 the trigger circuit 60 and the detector circuit 80 are represented in block form since these units are the same as the units 60 and 80 in the arrangement of Fig. 2. The arrangement of Fig. 5 differs from that of Fig. 2 in that a feedback circuit including a time-constant network having a series-connected condenser 97 and a resistor 96 is coupled through the terminal 63 to the control-electrode circuit of the tube 69 in the trigger circuit 60. The time constant of this network is substantially longer than the duration of the vertical retrace pulse represented by curve J. The junction of the resistor 96 and the condenser 97 is coupled to a control electrode of a triode 95, the anode of which is connected to a source of potential +B and the cathode of which is connected to the cathode load resistor 86.

The operation of the circuit arrangement of Fig. 5 is similar to that of the arrangement of Fig. 2 except for the disabling circuit including the time-constant network 96, 97 and the tube 95. The operation of this disabling circuit will now be described with reference to curves J, $L_1$, and O of Fig. 4. The same conditions of operation will be assumed as previously assumed with respect to the circuit arrangement of Fig. 2, that is, that the tube 69 is conducting and the tube 70 is at cut off at time $t_0$. At time $t_1$ the pulse occurring during the vertical retrace portion of the reproduced image and represented by curve J is applied through the terminals 42, 42 to develop a similar pulse signal across the cathode load resistor 86. Since the tube 69 in the trigger circuit 60 is conducting at this time, the potential of the control electrode of the tube 69 is positive causing the control electrode of the tube 95 to be sufficiently positive to permit current to flow therein. Consequently, a small positive potential is developed across the resistor 86 by the current flow in the tube 95 at this time causing the step portion in the interval $t_1$—$t_2$ in the negative-going pulse of the signal represented by curve O. At time $t_2$ as described previously herein, the tube 69 in the trigger circuit 60 becomes nonconductive while the tube 70 therein becomes conductive. At this time very little if any current flows through the tube 95 and the full effect of the pulse represented by curve J is developed across the resistor 86. At time $t_4$ a pulse representative of the vertical flyback pulse represented by curve J would normally be developed across the resistor 86. At the same time the tube 70 in the trigger circuit 60 becomes nonconductive and a positive pulse of large magnitude is applied to the control electrode of the tube 69 to render this tube conductive. This positive pulse of large magnitude also develops a positive signal across the resistor 96 causing a large current to flow in the tube 95. The current flow in the tube 95 develops a large positive potential across the resistor 86 which counterbalances the negative pulse which would normally be developed thereacross. Thus, a saw-tooth type signal as represented by the portion of the signal represented by curve O between the times $t_4$ and $t_7$ is developed across the resistor 86 preventing the detector circuit 80 from operating at this time. A similar disabling action occurs between the times $t_8$—$t_{11}$. Therefore, the noise pulse represented by curve $L_1$ is ineffective at the time $t_9$ to trigger the trigger circuit 60.

*Description and explanation of operation of circuit arrangement of Fig. 6*

There has been described herein with reference to Fig. 5 one circuit arrangement for disabling the field-identification system at a point therein prior to the input circuit of the trigger circuit 60. The arrangement described with reference to Fig. 5 utilized a disabling circuit including an additional time-constant network and an electron tube in order to apply a disabling signal to the cathode circuit of the detector circuit 80. It may be desirable to effect a similar result without utilizing such additional elements as the components 95, 96, and 97 of Fig. 5. The circuit arrangement of Fig. 6 may be employed to effect such a result. Since the arrangement of Fig. 6 is similar to the arrangement of Fig. 2, similar elements thereof are designated by the same reference numerals and analogous elements by the same reference numerals with a prefix of 6.

The arrangement of Fig. 6 differs from that of Fig. 2 in the proportioning of the resistors 683, 684, and 685 and of the condenser 687. In addition, the resistor 683 instead of being coupled to a source of potential +B is coupled through the terminal 61 to the anode circuit of the tube 69 in the trigger circuit 60. The resistors 683–685, inclusive, and the condenser 687 are proportioned to provide a time constant approximately equal to the interval between successive field pulses.

Considering now the operation of the arrangement of Fig. 6, it will be assumed as was assumed with respect to Figs. 2 and 5 that in the trigger circuit 60 the tube 69 is conductive and the tube 70 is nonconductive at the time $t_0$. Referring now to curve P of Fig. 4, at the time $t_1$, a pulse representative of the field retrace pulse is developed across the resistor 86 and is effective to render the tube 81 conductive during the duration of this pulse. At the time $t_2$ the tube 69 in the circuit 60, as previously described herein, becomes nonconductive while the tube 70 is rendered conductive. As the tube 69 becomes nonconductive the anode potential thereof rises and is applied through the resistor 683 to the time-constant network including the resistors 684 and 685 and the condenser 687. Thus, between the times $t_2$ and $t_3$ there is a slight rise in the positive potential across this time-constant network as represented by curve P of Fig. 4. At the time $t_3$ the pulse representative of the vertical retrace pulse terminates and the positive potential developed across the network including the resistors 684 and 685 and the condenser 687 continues to rise to a relatively high positive potential at the time $t_4$. At this time the pulse representative of the vertical retrace pulse is again developed across the resistor 86 and the tube 69 becomes conductive causing the anode potential thereof to fall. Thus, due to the time-constant action of the network including the resistors 684 and 685 and the condenser 687 and due to the presence of the negative-going pulse across the resistor 86, an effect such as is represented at times $t_4$, $t_6$, and $t_7$ is developed. The negative-going pulse occurring from time $t_4$ to time $t_6$ is not of sufficient potential to condition the tube 81 to be conductive during this period because of the positive potential previously developed across the time-constant network including the resistors 684, 685 and the condenser 687 during the interval $t_2$—$t_4$. The potential previously developed across the time-constant network decays in the interval $t_4$—$t_7$. An action similar to that which occurs in the interval $t_4$—$t_7$ also occurs in the interval $t_8$—$t_{11}$. Since the charging of the circuit including the resistors 684 and 685 and the condenser 687 is effective to nullify the normal gating effect of the negative-going pulse developed across the resistor 86 during the interval $t_8$—$t_{10}$ and the tube 81 is rendered nonconductive during this period, the noise pulse represented by curve $L_1$ occurring at time $t_9$ is ineffective to cause an output pulse to be developed in the output circuit of the tube 81 and consequently ineffective to trigger the trigger circuit 60. It is apparent that the latter disabling operation is effected solely by properly proportioning the resistors 683, 684, and 685 and the condenser 687 which are normally in the detector circuit including the tube 81. In addition to such proportioning, the resistor 683 is coupled to the anode circuit of the tube 69 in the trigger circuit 60. Thus, the desired disabling effect is accomplished without utilizing additional circuit elements.

Though the field-recognition system in accordance with the present invention has been described herein as including various types of disabling circuits in order to effect noise immunity in the recognition system, it is apparent that, generally, such noise immunity is obtained by causing the field-recognition system to be operative only during a short interval in each field of scan, this interval being in the vicinity of the field-frequency pulses, and the field-recognition system is disabled for a short period after it has responded during one of these intervals. Thus, effectively the field-recognition system is operative only during a short interval occurring once in each frame. It will be readily apparent to those skilled in the art that many types of feedback systems may be utilized to effect this result in accordance with the teaching of the present invention.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In an odd-line interlaced television system a field-identification system comprising: a circuit for supplying line-frequency pulses and groups of field-frequency pulses and subject to supply spurious noise pulses, said groups of field-frequency pulses having one time relation with respect to said line-frequency pulses during one group of fields and another time relation during interlaced fields; signal-generating means coupled to said supply circuit and responsive to said field-frequency pulses for developing a signal substantially in coincidence with each of said groups of field-frequency pulses and having a frequency of substantially one-half the frequency of said line-frequency pulses and a peak amplitude at a time in the vicinity of a line-frequency pulse of one of said one group of fields and which may at another time be in the vicinity of a noise pulse occurring during one of said interlaced fields; means coupled to said supply circuit for developing pulse signals substantially synchronous with said line-frequency pulses; means coupled to said supply circuit for developing pulse signals substantially synchronous with said field-frequency pulses; a signal-detection circuit jointly responsive to said developed field-frequency pulse signals, said developed line-frequency pulse signals and said developed coincidence signal for deriving resultant signals uniquely representative of one of said groups of field-frequency pulses but also subject to derive said resultant signals in response to at least some of said noise pulses; means including a trigger circuit alternately responsive to said developed field-frequency pulse signals and said resultant signals for alternately operating in individual ones of two stable operating conditions to develop a control signal; and means including a disabling circuit including a time-constant network responsive to said control signal for diminishing the response of said trigger circuit to those of said resultant signals developed in response to said noise pulses for an interval substantially less than the interval between successive groups of said field-frequency pulses for modifying said control signal, whereby said modified control signal is representative solely of the time relation of said line-frequency pulses and said groups of field-frequency pulses and is effective to identify each field.

2. In an odd-line interlaced television system a field-identification system comprising: a circuit for supplying line-frequency pulses and groups of field-frequency pulses and subject to supply spurious noise pulses, said groups of field-frequency pulses having one time relation with respect to said line-frequency pulses during one group of fields and another time relation during interlaced fields; means including a pulse-responsive circuit coupled to said supply circuit for developing a control signal uniquely representative of one of said groups of field-frequency pulses but also subject to develop said control signal in response to at least some of said noise pulses; means for utilizing said control signal; and means including a disabling circuit coupled to said pulse-responsive circuit and said means for utilizing and responsive to said control signal for substantially diminishing the response of said utilizing means to said control signal for an interval substantially less than the interval between successive groups of said field-frequency pulses.

3. In an odd-line interlaced television system a field-identification system comprising: a circuit for supplying line-frequency pulses and groups of field-frequency pulses and subject to supply spurious noise pulses, said groups of field-frequency pulses having one time relation with respect to said line-frequency pulses during one group of fields and another time relation during interlaced fields; means including a pulse-responsive circuit coupled to said supply circuit for developing a control signal uniquely representative of one of said groups of field-frequency pulses but also subject to develop said control signal in response to at least some of said noise pulses; means for utilizing said control signal; and means including a time-constant network coupled to said pulse-responsive circuit and said utilizing means and responsive to said control signal for developing a potential for substantially diminishing the response of said utilizing means to said control signal for an interval substantially less than the interval between successive groups of said field-frequency pulses.

4. In an odd-line interlaced television system a field-identification system comprising: a circuit for supplying line-frequency pulses and groups of field-frequency pulses and subject to supply spurious noise pulses, said groups of field-frequency pulses having one time relation with resect to said line-frequency pulses during one group of fields and another time relation during interlaced fields; means including a pulse-responsive circuit coupled to said supply circuit for developing a control signal uniquely representative of one of said groups of field-frequency pulses but also subject to develop said control signal in response to at least some of said noise pulses; means for utilizing said control signal; and means including a signal feedback circuit coupled to said pulse-responsive circuit and said utilizing means and responsive to said control signal for developing a potential for substantially diminishing the response of said utilizing means to said control signal for an interval substantially less than the interval between successive groups of said field-frequency pulses.

5. In an odd-line interlaced television system a field-identification system comprising: a circuit for supplying line-frequency pulses and groups of field-frequency pulses and subject to supply spurious noise pulses, said groups of field-frequency pulses having one time relation with respect to said line-frequency pulses during one group of fields and another time relation during interlaced fields; signal-generating means coupled to said supply circuit for developing a signal substantially in coincidence with each of said groups of field-frequency pulses and having a peak amplitude at a time in the vicinity of a line-frequency pulse of one of said one group of fields and which may at another time be in the vicinity of a noise pulse occurring during one of said interlaced fields; means coupled to said supply circuit for developing pulse signals representative of said line-frequency pulses; means including a control system coupled to said signal-generating means and said developing means and jointly responsive to said developed pulse signals and said developed coincidence signal for developing a control signal; means for utilizing said control signal; and means including a disabling circuit coupled to said control system and to said utilizing means and responsive ot said control signal for substantially diminishing the response of said utilizing means to said control signal for an interval substantially less than the interval between successive groups of said field-frequency pulses.

6. In an odd-line interlaced television system a field-identification system comprising: a circuit for supplying line-frequency pulses and groups of field-frequency pulses and subject to supply spurious noise pulses, said groups of field-frequency pulses having one time relation with respect to said line-frequency pulses during one group of fields and another time relation during interlaced fields; signal-generating means coupled to said supply circuit and responsive to said field-frequency pulses for developing a signal substantially in coincidence with each of said groups of field-frequency pulses and having a peak amplitude at a time in the vicinity of a line-frequency pulse of one of said one group of fields and which may at another time be in the vicinity of a noise pulse occurring during one of said interlaced fields; means coupled to said supply circuit for developing pulse signals representative of said line-frequency pulses; means including a control system coupled to said signal-generating means and said developing means and jointly responsive to said developed pulse signals and said developed coincidence signal for developing a control signal; means for utilizing said control signal; and means including a disabling circuit coupled to said control system and said utilizing means and responsive to said control signal for substantially diminishing the response of said utilizing means to said control signal for an interval substantially less than the interval between successive groups of said field-frequency pulses.

No references cited.